United States Patent [19]

El-Hibri et al.

[11] Patent Number: 5,151,462
[45] Date of Patent: Sep. 29, 1992

[54] FLAME RETARDANT BLENDS OF POLYSULFONE AND POLYALKYLENE PHTHALATE

[75] Inventors: Mohammad J. El-Hibri; Gregory S. Jack; William E. Kelly, all of Roswell; Sanjay R. Patel, Alpharetta, all of Ga.

[73] Assignee: Amoco Corporation, Chicago, Ill.

[21] Appl. No.: 768,016

[22] Filed: Sep. 30, 1991

[51] Int. Cl.$^5$ ................................................ C08K 3/38
[52] U.S. Cl. ................................. 524/405; 525/166
[58] Field of Search ..................... 524/405; 525/166

[56] References Cited

U.S. PATENT DOCUMENTS

| | | | |
|---|---|---|---|
| 4,338,243 | 7/1982 | Hecht et al. | 525/166 |
| 4,365,036 | 12/1982 | Lee | 525/166 |
| 4,619,971 | 10/1986 | Yates, III et al. | 525/166 |
| 4,921,897 | 5/1990 | Danforth et al. | 524/405 |
| 5,032,639 | 7/1991 | Buchert et al. | 524/405 |

*Primary Examiner*—Paul R. Michl
*Assistant Examiner*—O. Asinovsky
*Attorney, Agent, or Firm*—Janice M. McLain; William H. Magidson; Frank J. Sroka

[57] ABSTRACT

This invention relates to flame retardant blends of polysulfone, with polyalkylene phthalate. The present blends are flame retardant, even at thin part thickness.

10 Claims, No Drawings

FLAME RETARDANT BLENDS OF POLYSULFONE AND POLYALKYLENE PHTHALATE

BACKGROUND OF THE INVENTION

This invention relates to flame retardant blends of polysulfone, with polyalkylene-phthalate The present blends are flame retardant even at thin part thickness.

Aromatic polymers such as polyethylene terephthalate, polyarylsulfones, and poly(aryl ether) sulfones, in admixture with themselves, or when blended, do not exhibit adequate flame retardancy. As a result, various flame retardant additives have been disclosed which render such compositions flame retardant in varying degrees of effectiveness.

There are many known flame retardant additives which are employed by mixing them with other materials such as polymers to render materials flame retardant. Such flame retardant additives have been known to be employed in amounts of at least 1 weight percent in order to provide flame retardant characteristics to those products which are combustible.

The use of compounds containing phosphorus and/or nitrogen as flame retardant additives for some polymers has been recognized, as has been the use of various halogenated materials, such as chlorinated paraffin wax, and antimony compounds such as antimony oxide, and mixtures thereof. One disadvantage, however, in regard to the known materials which have been used as flame retardants has been the fact that generally a large amount of the additive must be incorporated into the polymer to make it sufficiently flame retardant. In addition, flame retardant additives frequently do not stand up to processing conditions and will in some cases separate out from the resin after incorporation. The search for fire-retarding adjuvants is important because it is essential that many resin compositions have relatively high resistance to burning if they are to be commercially utilizable. Further, the resins must be capable of enduring heat without deterioration and be able to resist fire and flame. Especially, materials used in conjunction with electricity must be able to resist ignition or deterioration by heat and sparks. As the requisite degree of flame retardance is achieved, it is essential that the other desirable qualities of the resinous material be preserved or enhanced. In addition to the preservation of the mechanical properties of the polymer, it is desirable that the color should not be adversely affected.

Flame retarding additives such a triphenyl phosphate or aluminum trihydrate which generally possess low flammability have been mixed with engineering thermoplastics to reduce flammability of the thermoplastics. However, a blend of such a low flammability additive with high performance engineering thermoplastics often does not yield a useable flame resistant composition. For example, the low flammability additive may not be compatible, with the engineering thermoplastic, at additive concentrations achieving significant flame retardance, resulting in lower levels of flame resistance, or the additive may not be stable at the processing temperatures of the engineering thermoplastic. Furthermore, low flammability additives which are compatible with a particular engineering thermoplastic often cannot effectively lower the flammability of the thermoplastic. If the effect on flammability is merely a reduction due to dilution, then amounts of the low-flammability additive necessary to achieve a desired reduction in flammability can adversely affect the physical properties or processibility of the engineering thermoplastic.

Perfluorocarbon polymers have been used in the past to inhibit drip in thermoplastics and improve heat and smoke release in polysulfone. EPO307,670 to Rock discloses that polysulfone with 10 percent perfluorocarbon added has improved heat and smoke release characteristics. It does not show blends of polyester with polysulfone or the advantage of adding borate salts to the combination. Further, it does not disclose UL-94 test data. EPO400,935 discloses flame retardant glass fiber reinforced polyesters including polyalkylene terephthalate and another polymer. The synergistic flame retardant use of PTFE and borate salts are not taught or suggested. Thermoplastic blends of aromatic polysulfones and thermoplastic polyesters are known from Nield, U.S. Pat. No. 3,742,087. Nield states that the blends may be mixed with particles of other polymeric materials as fillers having special properties, e.g., elastomeric materials and polytetrafluoroethylene (PTFE). There is no disclosure of the difficulty of achieving flame retardancy (UL-94 at V-1 to V-0) in thin part thickness (e.g. down to 60 mils) plastics nor the use of polytetrafluoroethylene in conjunction with zinc borate in order to achieve flame retardancy of thin films of the present blends. Blends of poly(aryl ether), polyester and a compatibilizing amount of polycarbonate are disclosed in Robeson, U.S. Pat. No. 4,369,136. Robeson discloses that flame retardants may be used but does not delineate the particular flame retardants of the present invention or the advantages thereof in regard to thin films. In U.S. Ser. No. 753,188 an application by the present inventor, compatibilized and miscible blends of poly(aryl ether) and/or polycarbonate, polyarylate, and polyester are disclosed. In EPO364,729, a polycarbonate composition with PTFE, boric oxide and a graft copolymer of methyl methacrylate, butadiene and styrene and/or styrene-maleic anhydride copolymer were shown to have a UL-94 of V-0, however polycarbonate with PTFE and boric oxide, without styrene, only achieved a UL-94 of V-1 at 1.6 mm.

In Saito, U.S. Pat. No. 4,820,761, polysulfone with PTFE is disclosed as an aid for low mold shrinkage and good mold releasability. There is no mention of the present blends or the use of borate salts.

Zinc borate has been used in various thermoplastic compositions. Cella, et al., U.S. Pat. No. 4,833,190 discloses use of zinc borate as a smoke suppressant and flame retardant in silicone containing compositions. Anderson, U.S. Pat. No. 4,049,619 discloses a thermoplastic composition of a polysulfone, a flame retarding bisphenoxy compound and an enhancing agent, which is disclosed as including zinc borate.

Anderson, U.S. Pat. Nos. 4,041,013 and 4,049,619 disclose plastic compositions containing polysulfone and bisphenoxy compounds along with certain enhancing agents including zinc borate, the preferred enhancing agent being antimony trioxide. There is no teaching of a preference for zinc borate or its synergistic use with PTFE as flame retardants in the present thin film blends. In U.S. Pat. No. 4,981,895 to Buchert, a molding composition consisting of polyether sulfone or polyether ketone or mixtures thereof in conjunction with zinc borate were said to have improved heat release characteristics. No mention of the particular polysulfone of the present invention or its blend with polyester of PTFE were mentioned. This is significant since blending polyalkylene phthalate with polysulfone while having distinct advantages, significantly reduces flame retardancy of neat polysulfone.

Blends of polysulfone and other polymers such as polyalkylenephthalate combine the advantageous properties of impact resistance, hydrolytic stability, dimensional stability, and heat resistance of the polysulfone and yet can be tailored to lower the cost and not interfere with the advantageous properties. Blends of poly(aryl ether) and polycarbonate or polyester are known from U.S. Pat. Nos. 3,365,517, 3,742,087, 4,369,136, 4,371,672, and 4,746,710. It is shown in these patents that as a result of the blend the polymers are rendered more resistant to environmental stress crazing and cracking their heat distortion temperature is increased and the poly(aryl ether) is made more resistant to thermal stress and aging embrittlement. Furthermore, improved hydrolytic stability is disclosed. Thus, it can be seen that alloying of poly(aryl ether) sulfone with polyalkylenephthalate leads to materials with improved physical characteristics.

Unfortunately, by adding polyalkylenephthalate to polysulfone flame retardancy is significantly diminished. Thus, it has become particularly critical to improve the flame retardancy of the composition, first of all, in order to bring it up to par with the known flame retardant compositions utilizing polysulfone in the industry.

DETAILED DESCRIPTION OF THE INVENTION

The present invention is to a blend of polysulfone and polyalkylenephthalate with optimum flame retarding amounts of a borate salt and a synergistic amount of polytetrafluoroethylene (PTFE).

It has been found that when polytetrafluoroethylene and zinc borate salts in the specified proportions are added to blends of the present polysulfone and polyester that UL-94 flame retardancy of V-0 can be achieved at part thickness down to 60 mils. A flame retardant polymer blend comprising (a) polysulfone; (b) polyalkylenephthalate; and (c) a flame retardant comprising borate salt and polytetrafluoroethylene.

The polysulfone of the present invention is described in U.S. Pat. Nos. 3,264,536, 4,108,837, 4,175,175. It preferably has the following repeating units:

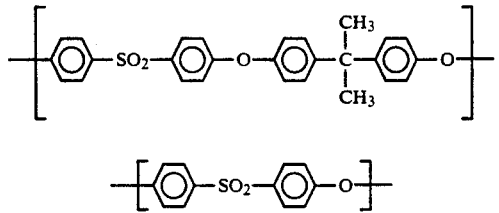

The poly(aryl ethers) are prepared by using the alkali metal salt of the dihydric phenols, i.e., the alkali metal carbonate or alkali metal hydroxide process.

If carbonate is used, the polymers are prepared by contacting substantially equimolar amounts of the hydroxy-containing compounds and the dihalo- or dinitrobenzenoid compound, e.g., 4,4'-dichlorodiphenyl sulfone or 4,4'-difluorodiphenyl sulfone, with from about 0.5 to about 1.0 mole of an alkali metal carbonate per mole of hydroxyl group in a solvent mixture comprising a solvent which forms an azeotrope with water in order to maintain the reaction medium at substantially anhydrous conditions during the polymerization.

The temperature of the reaction mixture is kept at about 170° C. to about 250° C., preferably from about 210° C. to about 235° C. for about one to about 15 hours. However, lower or higher temperatures may also be adequate.

In a modification which is particularly suitable for making copolymers from bisphenol A and one or more additional dihydroxy compounds, the reactants other than said additional dihydroxy compounds are charged and heated at from about 120° C. to about 180° C. for about 1 to about 5 hours, said additional dihydroxy compounds are added, the temperature is raised and the mixture is heated at from about 200° C. to about 250° C., preferably from about 210° C. to about 240° C., for about one to 10 hours. This modification is further described in D. R. Kelsey, et al., U.S. Pat. No. 4,783,520, hereby incorporated by reference.

The reaction is carried out in an inert atmosphere, e.g., nitrogen, at atmospheric pressure, although higher or lower pressures may also be used.

The poly(aryl ether) is then recovered by conventional techniques such as coagulation, solvent evaporation, and the like.

The solvent mixture comprises a solvent which forms an azeotrope with water and a polar aprotic solvent. The solvent which forms an azeotrope with water includes an aromatic hydrocarbon such as benzene, toluene, xylene, ethylbenzene, chlorobenzene, and the like.

The polar aprotic solvents employed in this invention are those generally known in the art for the manufacture of poly(aryl ether) sulfones and include sulfur-containing solvents such as those of the formula:

in which each $R_4$ represents a monovalent lower hydrocarbon group free of aliphatic unsaturation, which preferably contains less than about 8 carbon atoms or when connected together represent a divalent alkylene group with $\delta$ being an integer from 1 to 2 inclusive. Thus, in all of these solvents, all oxygens and 2 carbon atoms are bonded to the sulfur atom. Contemplated for use in this invention are such solvents as those having the formula:

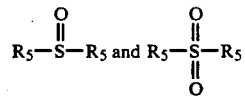

where the $R_5$ groups are independently lower alkyl, such as methyl, ethyl, propyl, butyl, and like groups, and aryl groups such as phenyl and alkylphenyl groups such as the tolyl group, as well as those where the $R_5$ groups are interconnected as in a divalent alkylene bridge such as:

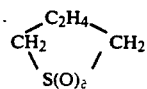

in tetrahydrothiophene oxides and dioxides. Specifically, these solvents include dimethylsulfoxide, dimethylsulfone, diphenylsulfone, diethylsulfoxide, diethylsulfone, diisopropylsulfone, tetrahydrothiophene 1,1-dioxide (commonly called tetramethylene sulfone or sulfolane) and tetrahydrothiophene-1 monoxide.

Additionally, nitrogen-containing solvents may be used. These include dimethylacetamide, dimethylformamide and N-methylpyrrolidone.

The azeotrope-forming solvent and polar aprotic solvent are used in a weight ratio of from about 1:10 to about 1:1, preferably from 1:5 to about 1:3.

In reaction, the hydroxy-containing compound is slowly converted, in situ, to the alkali salt thereof by reacting with the alkali metal carbonate. The alkali metal carbonate is preferably potassium carbonate. As indicated before, mixtures of carbonates such as potassium and sodium carbonate may also be used.

Water is continuously removed from the reaction mass as an azeotrope with the azeotrope-forming solvent so that substantially anhydrous conditions are maintained during the polymerization.

It is essential that the reaction medium be maintained substantially anhydrous during the polycondensation. While amounts of water up to about 1 percent can be tolerated, and are somewhat beneficial when employed with fluorinated dihalobenzenoid compounds, amounts of water substantially greater than this are desirably avoided as the reaction of water with the halo and/or nitro compound leads to formation of phenolic species and only low molecular weight products are secured. Consequently, in order to secure the high polymers, the system should be substantially anhydrous, and preferably contain less than 0.5 percent by weight water during the reaction.

When using alkali metal, an alkali metal salt of a dihydric phenol is contacted with a dihalobenzenoid compound in the presence of a sulfur-containing solvent as herein above defined under substantially anhydrous conditions.

Additionally, the poly(aryl ethers) may be prepared by other methods known in the prior art, in which at least 1 dihydric phenol and at least 1 dihalobenzenoid compound are heated, for example, with a mixture of sodium carbonate or bicarbonate and a second alkali metal carbonate or bicarbonate having a higher atomic number than that of sodium, as described in U.S. Pat. No. 4,176,222. Bulk processes are also known.

The poly(aryl ethers) have reduced viscosities in the range of from about 0.35 to about 1.2 dl/g, preferably from about 0.38 to about 1.0 dl/g, as measured in chloroform or another appropriate solvent, at 25° C. or at another appropriate temperature, at a concentration of 0.2 g/100 ml. At reduced viscosities below about 0.35 dl/g, the poly(aryl ethers) are brittle; at reduced viscosities higher than about 1.2 dl/g, the poly(aryl ethers) have very high melt viscosities and are very difficult to fabricate from the melt.

The weight percent of polysulfone used in compositions of the invention is in the range of about 20 parts to about 80 percent of polymeric material.

The most preferred polysulfone is a poly(aryl ether) including repeating moieties as shown:

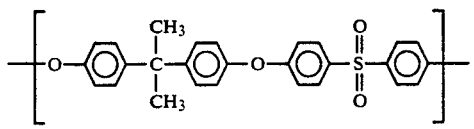

It is available commercially from Amoco Performance Products, Inc. under the trade name Udel ® P-3703. It has a reduced viscosity of about 0.43 dl/g as measured in chloroform at a concentration of 0.2 g/dl and 25° C. It has a number-average molecular weight of about 13,000 as measured by gel permeation chromatography (GPC) using tetrahydrofuran (THF) as solvent and polystyrene calibration standards.

Polyalkylene Phthalates

The polyesters which are suitable for use herein are derived from an aliphatic or cycloaliphatic diol, or mixtures thereof, containing from 2 to about 10 carbon atoms and at least 1 aromatic dicarboxylic acid. The polyesters which are derived from an aliphatic diol and an aromatic dicarboxylic acid have repeating units of the following general formula:

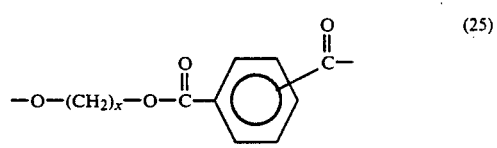

wherein x is an integer of from 2 to 4.

The preferred polyesters are poly(ethylene terephthalate) and poly(butylene terephthalate).

Also contemplated herein are the above polyesters with minor amounts, e.g., from 0.5 to about 2 percent by weight, of units derived from aliphatic acid and/or aliphatic polyols, to form copolyesters. The aliphatic polyols include glycols, such as poly(ethylene glycol). These can be made following the teachings of, for example, U.S. Pat. Nos. 2,465,319 and 3,047,539.

The polyesters which are derived from a cycloaliphatic diol and an aromatic dicarboxylic acid are prepared by condensing either the cis- or trans-isomer (or mixtures thereof) of, for example, 1,4-cyclohexanedimethanol with an aromatic dicarboxylic acid so as to produce a polyester having recurring units of the following formula:

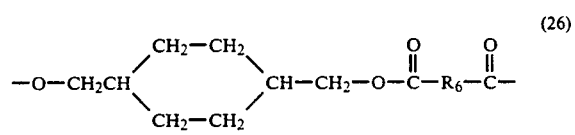

wherein the cyclohexane ring is selected from the cis- and trans-isomer thereof and $R_6$ represents an aryl radical containing 6 to 20 carbon atoms and which is the decarboxylated residue derived from an aromatic dicarboxylic acid.

Examples of aromatic dicarboxylic acids indicated by $R_6$ in formula (26), are isophthalic or terephthalic acid, 1,2-di(p-carboxyphenyl)ethane, 4,4'-dicarboxydiphenyl ether, etc., and mixtures of these. All of these acids contain at least 1 aromatic nucleus. Fused rings can also be present, such as in 1,4-or 1,5-naphthalenedicarboxylic acids. The preferred dicarboxylic acids are terephthalic acid or a mixture of terephthalic and isophthalic acids.

A preferred polyester may be derived from the reaction of either the cis-or trans-isomer (or a mixture thereof) of 1,4-cyclohexanedimethanol with a mixture of isophthalic and terephthalic acids. The polyesters have repeating units of the formula:

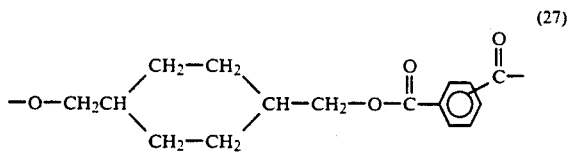

Another preferred polyester is a copolyester derived from a cyclohexane dimethanol, an alkylene glycol and an aromatic dicarboxylic acid. These copolyesters are prepared by condensing either the cis-or trans-isomer (or mixtures thereof) of, for example, 1,4-cyclohexanedimethanol and an alkylene glycol with an aromatic dicarboxylic acid so as to produce a copolyester having repeating units of the following formula:

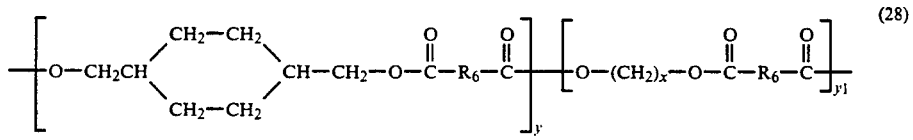

wherein the cyclohexane ring is selected from the cis- and trans-isomers thereof, $R_6$ is as previously defined, x is an integer of 2 to 4, the $y^1$ units comprise from about 10 to about 90 mole percent and the $y^1$ units comprise from about 10 to about 90 mole percent of the total $(y+y^1)$ units.

The preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

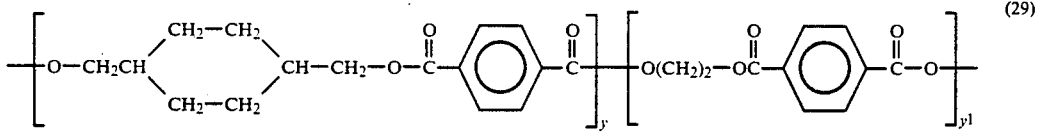

wherein y and $y^1$ are as previously defined.

The polyesters as described herein are either commercially available or can be produced by methods well-known in the art, such as those set forth in, for example, U.S. Pat. No. 2,901,466.

The polyesters used herein have an intrinsic viscosity of from about 0.4 to about 2.0 dl/g as measured in a 60:40 phenol/tetrachloroethane mixture or similar solvent at 23°-30° C.

Borate Salts

The borate used should be anhydrous, having water amounts less than 0.2 weight percent of the borate; hydrated borate or borates with greater water content can result in unprocessable compositions. Any suitable anhydrous zinc borate may be used. Anhydrous zinc borate having a particle size of 6–10 microns, is available as XPI-187 from U.S. Borax and is produced by thermal dehydration of zinc borate at 500° C. The amount of zinc borate to be used is an effective amount to achieve flame retardance, and preferably is about 1.0 to about 10.0 parts by weight per 100 parts combined weight of the total composition.

Polytetrafluoroethylene (PTFE)

PTFE can be purchased from Du Pont or Ausimont.
Paste:
This is a high molecular weight form of PTFE that is prepared as a dispersion of about 0.2 microns. This material is then coagulated to give particles of about 400 to 500 microns. These materials are soft and fibrillate at room temperature. Typical grades of this type are: Algoflon DF 1, DF 200 and DFC.
Granular:
This is a high molecular weight PTFE that is made in a suspension process that results in a 20 micron size powder. This material fibrillates at high temperature or under high sheer conditions. Typical grades are: Algoflon F5, F2 and F6.

Wax:
This is a low molecular weight PTFE that has no tendency to fibrillate. This material is usually made by degrading high molecular weight materials using radiation. The particle size varies by grade and is typically 6 to 25 microns. This type can be formed from direct reaction from the monomer, but that is not the process that Ausimont uses. Typical grades are: Polymist F-5A, F-5, and F-510.

Teflon T-60 is a fibrillating fluoropolymer supplied by EI Du Pont DeNemours Inc.

Preparation of Blends

In preparing the blends of the present invention the individual components are commonly provided in the form of chips, pellets or powders, and physically mixed together in any appropriate apparatus, e.g., a mechanical drum tumbler. The physical mixture can be then dried if desired, preferably under vacuum or in a circulating air oven, although any other suitable apparatus can be used. The purpose of the drying step is to remove water from the physical mixture so as to prevent degradation. After the mixture of the solid polymer particles (which, optionally, may also contain reinforcing filler, fiber, and the like-vide infra) has been dried, the blend can be prepared. A convenient method of forming the blend is melt extrusion. The extrusion apparatus thoroughly mixes the polymers in the melt and then extrudes the blend in the form of a strand which, upon solidification, can be broken up into chips or pellets. Both single screw and twin-screw extruders can be used for the preparation of the instant blends.

Any suitable procedure can be used to compound the compositions of the invention, and the solid components can be mixed with each other in any particular order. Applicants prefer to blend desirable amounts of all solids present and then heat the resulting mixture to above the transition temperature (Tg) of the highest Tg polymer in the mixture. The molten mixture is then mixed for any suitable period to achieve thorough dispersion of the additive(s) and mixing of the polymers present, and then extruded and cooled into any desirable shape. Such a process can be conveniently carried out with commercial extruders such as a Berstorff. In the compositions of the invention which comprises $TiO_2$, it is not necessary to add the oxide initially. For example, the composition containing zinc borate can be compounded first, and desirable amounts of $TiO_2$ can be mixed in later.

All materials were prepared by first dry blending the components using a mechanical blender (turned end over end). They were then compounded using a Berstorff ZE25, 25 mm corotating twin-screw extruder.

The resulting mixture is then fed to an extruder operating at about 265° C., and the extrudate is formed into pellets. These pellets are then injection molded at about 300° C. into test bars of about 5 inches by ½ inch by about 1/16 inch thick. Five test bars are subject to the test procedure set forth in Underwriters' Laboratories Inc., Subject UL-94, Burning Test for Classifying Materials. In accordance with this test procedure, materials so investigated are rated either V-0, V-1, or V-2 based on the results of 5 specimens. The criteria for each rating per UL-94 is shown under experimental methods.

The instant alloys can be melt processed in the substantial absence of polymer degradation to form a variety of relatively stiff shaped articles, e.g., molded three-dimensional articles, fibers, films, tapes, etc.

Articles may also be molded from a molding compound which includes, as 1 component, the blend of the present invention. Such a molding compound incorporates into the blend of the present invention approximately 1 to 50 percent, preferably approximately 10 to 30 percent by weight, based upon the total weight of the molding compound, of a solid filler and/or reinforcing agent. Representative fibers which may serve as reinforcing media include glass fibers, asbestos, graphitic carbon fibers, amorphous carbon fibers, synthetic polymeric fibers, aluminum fibers, aluminum silicate fibers, oxide of aluminum fibers, titanium fibers, magnesium fibers, wollastonite, rock wool fibers, steel fibers, tungsten fibers, cotton, wool, and wood cellulose fibers, etc. Representative filler materials include glass, calcium silicate, silica, clays, talc, mica, carbon black, titanium dioxide, wollastonite, polytetrafluoroethylene, graphite, alumina trihydrate, sodium aluminum carbonate, barium ferrite, etc.

The polymers may also include additives such as thermal stabilizers, ultraviolet light stabilizers, plasticizers, and the like.

The materials of this invention may be fabricated into any desired shape, i.e. moldings, coatings, films or fibers.

EXPERIMENTAL

The following designations are used throughout to describe the polymers referred to in the examples:

Polysulfone-A poly(aryl ether) having the repeat unit of formula:

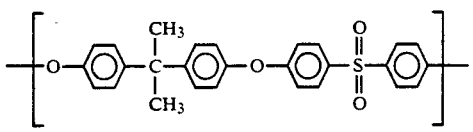

It is available commercially from Amoco Performance Products, Inc. under the trade name Udel ® P-3703. It has a reduced viscosity of about 0.43 dl/g as measured in chloroform at a concentration of 0.2 g/dl and 25° C. It has a number-average molecular weight of about 13,000 as measured by gel permeation chromatography (GPC) using tetrahydrofuran (THF) as solvent and polystyrene calibration standards.

Another polysulfone that may be used includes the following repeating unit. One such polysulfone is available commercially from Imperial Chemical Incorporated:

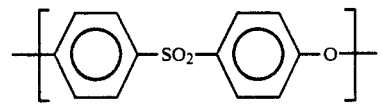

PET:

Poly(ethylene terephthalate)—A polymer having the following repeat unit structure:

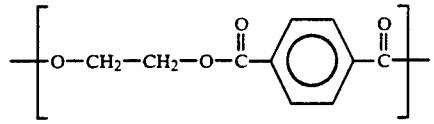

This polymer is widely available from a number of U.S. suppliers. The resin used carried the trade name Cleartuff 7202 and is a product of Goodyear Co. This material has a Tg of about 80° C. in the fully amorphous state (the Tg increases slightly with the level of crystallinity). The polymer has a crystalline melting point of about 260° C. as measured by differential scanning calorimetry.

ZnO is zinc oxide, an inorganic filler that when reacted with boric acid is able to produce zinc borate. It was used in powder form.

OCF (Owens Corning Fiberglass) 497-DB is ⅛" long chopped glass with an appropriate sizing agent for compatibility with the polymer matrix.

Kemamide W-405 N,N'-ethylenebisstearamide, fatty bisamide derived from stearic acid (sold by Humko Chemical).

KZTPP is a cyclo[dineopentyl(diallyl)]pyrophosphate dineopentyl(diallyl)zirconate chemical structure is shown below.

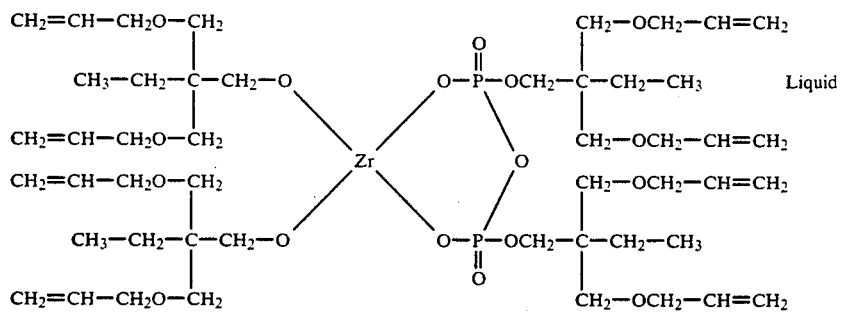

It is manufactured by Kenrich Petrochemicals, Inc. of Bayonne, N.J.

Experimental Methods

Specimens obtained from the experiments embodied in the examples below were tested by a variety of techniques using standard 5"×0.5"×0.125" injection molded specimens (ASTM D-790). Instrumented impact measurements we performed on 0.125 inch thick circular disk injection moldings 2 inch in diameter.

Failure Load is determined using a instrument impact tester such as that manufactured by Dynatup. The failure load is determined by measuring the force at peak-energy absorbed by a molded part by a falling tup prior to crack propagation.

Max. load is determine using the same instrument as described above. This value is determined by measuring the force at total energy absorbed by a molded part by a falling tup.

Sp Gr is measured on molded parts to determine its density relative to water.

Flex Str. is a mechanical property test performed according to ASTM D-790. Flammability testing was performed per the UL-94 vertical burn test specifications using ASTM injection molding 5"×0.5"×0.62" nominal dimensions.

Flammability Ratings

"94 V-0":

No single flaming combustion after removal of the igniting flame shall exceed 10 seconds and none of the specimens shall drip flaming particles which ignite absorbent surgical cotton placed 12" below the specimen. Total flame out time for all 5 specimens (10 ignitions) cannot exceed 50 seconds.

"94 V-1":

No single flaming combustion after removal of the igniting flame shall exceed 30 seconds and none of the specimens shall drip flaming particles which ignite absorbent surgical cotton placed 12" below the specimen. Total flame out time for all 5 specimens (10 ignitions) cannot exceed 250 seconds.

"94 V-2":

No single flaming combustion after removal of the igniting flame shall exceed 30 seconds. The specimens drip flaming particles which burn only briefly, some of which ignite absorbent surgical cotton placed 12" below the specimen. Total flame out time for all 5 specimens (10 ignitions) cannot exceed 250 seconds.

In addition, a test bar which continues to burn for more than 30 seconds after removal of the igniting flame is classified, not by UL-94, but by the standards of the instant invention, as "burns." Further, UL-94 requires that all test bars in each test group must meet the V type rating to achieve the particular classification. Otherwise, the 5 bars receive the rating of the worst single bar. For example, if 1 bar is classified as 94 V-2 and the other 4 are classified as 94 V-0, then the rating for all 5 bars is 94 V-2.

EXAMPLES

The following examples are intended to give specific illustrations of the practice of this invention and are not intended in any way to limit the scope of this invention.

Comparative Example 1(C-1)

A 75/25 by weight blend of UDEL P-3703 polysulfone (PSF-3703) and Cleartuff® 7207 poly(ethylene terephthalate) (PET) were tumble-mixed and dried as described in Comparative Example 1. The dry pellet mix was then melt-blended using the equipment described in Comparative Example 1. The same conditions were used except for a lower melt temperature of about 290° C. The blend was dried and molded as described in Comparative Example 1, except for lower processing temperatures. The barrel temperature profile used was 270°-295° C. with a nozzle temperature of 295° C. The mold temperature was set at 90° C. The molded 0.062" thick specimens were tested for flammability in accordance with the UL-94 vertical burn specification. The results from this test, which are given in Table 1, indicated that this blend does not meet any of the UL-94 classifications for flammability resistance. That was because the burn times were exceeded for both the maximum burn time for a single application as well as for the cumulative burn time for the 5 specimens tested.

Comparative Example 2(C-2)

A 65/35 by weight blend of the same PSF and PET resins used in Comparative Example 2 was prepared by first drying the resins as per Comparative Examples 1, and then extruding the dry mix through a non-vented twin screw Brabender counter-rotating twin-screw unit. The blend was run through the extruder at a rate of 4.5 lb/hr and the melt temperature was about 290° C. The screw speed of extruder was 40 rpm. The blend sample thus produced was dried again prior to injection molding into 0.062"-thick specimens using the Arburg injection molding machine and conditions described in Comparative Example 2. UL-94 flammability testing was performed on specimens from this polymer blend and the results are summarized in Table 1. The specimens from this sample burned vigorously on the first flame application which did not stop to allow a second flame application. Additionally, 4 out of 5 specimens dripped igniting cotton on the floor of the test chamber.

This material thus failed the UL-94 vertical flammability test in all its classifications.

Example 1

The following blend composition was prepared using weight percentages of the various components as indicated: Udel P-3703 (68.63%), PET (22.87%), zinc borate (6%), and F5A non-fibrillating PTFE (2.5%). The blend was prepared and tested following procedures substantially similar to those described in Comparative Example 2. The UL-94 flammability results obtained for this composition show a marked improvement in flammability over the corresponding control case embodied in Example 2. The flammability rating based on the burning behavior and durations was V-1. The burn times are given in Table 1. The synergistic effect of PTFE and zinc borate is thus demonstrated.

Example 2

The following blend composition was prepared using weight percentages of the various components as indicated: Udel P-3703 (65.25%), PET (21.75,), zinc borate (9%), and F5A non-fibrillating PTFE (4%). The blend was prepared and tested following procedures substantially similar to those described in Comparative Example 2. The UL-94 flammability results obtained for this composition show a marked improvement in flammability over the corresponding control case embodied in Example 2. Comparing with Example 2, there is also a significant benefit obtained from increasing the level of the two flame retardants in the composition. The flammability rating of this formulation based on the burning behavior and durations was V-1. The key burn times are given in Table 1.

EXAMPLES 3-5

Three PSF/PET flame retarded blend compositions were prepared from Udel® P-3703 PSF, PET, zinc borate, and Algoflon DM-1, another fibrillating PTFE supplied by Du Pont. For each of the three formulations the ratio of PSF to PET was maintained at 65/35 by weight. All three formulations contained 6 weight percent zinc borate and the level of DM-1 was 1, 2, and 3 weight percent, respectively, for the three formulations. The exact weight percentages of the four components are given in Table 3. These materials were prepared, molded into 0.062"-thick ASTM bars and tested for flammability behavior using very similar procedures to those employed in Example 2. The UL-94 flammability rating for these formulations was V-1 for all three cases, and the burn times decreased for the three formulations, as shown in Table 3, in a manner consistent with the level of DM-1 fluoropolymer.

Other compositions were prepared by the same method as Examples 1-5 the compositions and results are shown in Table I.

Examples 6 and 7

Two more formulations were prepared similar to those of Examples 3-5 above, except that the level of DM-1 was maintained at 2 weight percent while the level of zinc borate was lowered to 4 and 2 weight percent, respectively, the exact compositions are, again, given in Table 1 along with the UL-94 flammability results. While both of these formulations afforded a V-1 flammability rating, the composition containing 4 weight percent zinc borate gave significantly better performance than that containing only 2 percent zinc borate. This supports the notion that a synergistic effect exists in this dual flame retardant system. This synergism is apparently lost if the ratio of zinc borate of PTFE is either too high or too low.

Example 8 and Comparative Example 3 (C-3)

To investigate the effect of PSF/PET ratio on the flammability performance of these formulations, two additional compositions were prepared in which this ratio was set at 75/25 and 55/45, while the levels of DM-1 PTFE and zinc borate were maintained at 2 and 6 weight percent for both compositions. The pertinent data for these two examples are given in Table 1. The UL-94 result for the first formulation is V-1 with a relatively low cumulative burn time of about 90 seconds. For the second formulation (55/45 PSF/PET ratio), on the other hand, no acceptable vertical flammability rating is achieved with the total burn well exceeding the 250 sec limit required for V-2. It is thus noted that the UL-94 flammability performance is sensitive to the PSF/PET ratio. For ratios significantly lower than 60/40 PSF/PET it is unlikely that the flame retardance additives of this invention will be effective.

TABLE 1

| | \multicolumn{11}{c}{Example No.} | | | | | | | | | | |
|---|---|---|---|---|---|---|---|---|---|---|---|
| | D | E | F | G | H | I | J | C-1 | 1 | 2 | C-2 | 3 |
| PSF Udel P1700 (wt %) | 97 | 95 | 93 | 97.5 | 95 | | | | | | | |
| PSF P3703 | | | | | | | | 75 | 68.63 | 65.25 | 65 | 60.45 |
| PC Lexan 104 | | | | | | | | | | | | |
| PC Lexan 2015 | | | | | | | | | | | | |
| PET Cleartuf | | | | | | | | 25 | 22.87 | 21.75 | 35 | 32.55 |
| Makrolon 3108 | | | | | | | | | | | | |
| ZnBO3 Ground | | | | | | | | | 6 | 9 | | 6 |
| ZnBO3 | 3 | 5 | 7 | | | | | | | | | |
| Boric Acid | | | | | | | | | | | | |
| PTFE F5A | | | | 2.5 | 5 | | | | 2.5 | 4 | | |
| DF-1 Algoflon | | | | | | | | | | | | 1 |
| T-60 | | | | | | | | | | | | |
| ZnO | | | | | | | | | | | | |
| OCF 497 DB | | | | | | | | | | | | |
| Kemamide W40 | | | | | | | | | | | | |
| Ultracarb | | | | | | | | | | | | |
| Antimony Oxide | | | | | | | | | | | | |
| KZTPP | | | | | | | | | | | | |
| Decabromo FR | | | | | | | | | | | | |
| Total Burn (sec) | 60 | 79 | 37 | 22 | 24.5 | | | >250 | 111 | 66 | 384 | 170.3 |
| Highest Single Burn | 23 | 32 | 8 | 5 | 4 | | | >60 | 30 | 14 | >75 | 27 |
| Rating (UL-94) | V-2 | Greater than V-2 | V-0 | V-0 | V-0 | | | Greater than V-2 | V-1 | V-1 | Greater than V-2 | V-1 |

TABLE 1-continued

Failure load (lbs)
Max. load (lbs)
Sp Gr
Flex Strength (psi)

| | | Example No. | | | | | | |
|---|---|---|---|---|---|---|---|---|
| | | 4 | 5 | K | L | M | N | O | P |
| PSF Udel P1700 (wt %) | | | | | | | | | |
| PSF P3703 | | 59.80 | 59.15 | 61.10 | 62.40 | 69 | 50.6 | 41 | 41 |
| PC Lexan 104 | | | | | | | | | |
| PC Lexan 2015 | | | | | | | | | |
| PET Cleartuf | | 32.20 | 31.85 | 32.90 | 33.60 | 23 | 41.4 | 23 | 22.5 |
| Makrolon 3108 | | | | | | | | 7.0 | 6.0 |
| ZnBO3 Ground | | | | | | | | | |
| ZnBO3 | | 6 | 6 | 4 | 2 | 6 | 6 | | 6 |
| Boric Acid | | | | | | | | | |
| PTFE F5A | | | | | | | | | 2.5 |
| DF-1 Algoflon | | 2 | 3 | 2 | 2 | 2 | 2 | | |
| T-60 | | | | | | | | | |
| ZnO | | | | | | | | | |
| OCF 497 DB | | | | | | | | 22 | 21 |
| Kemamide W40 | | | | | | | | 1.0 | 1.0 |
| Ultracarb | | | | | | | | | |
| Antimony Oxide | | | | | | | | | |
| KZTPP | | | | | | | | | |
| Decabromo FR | | | | | | | | 6.0 | |
| Total Burn (sec) | | 150.6 | 129.6 | 128.2 | 168.3 | 91.3 | 464.7 | | |
| Highest Single Burn | | 27 | 21 | 22 | 27 | 17 | 123 | | |
| Rating (UL-94) | | V-1 | V-1 | V-1 | V-1 | V-1 | Greater than V-2 | V-0 | V-2 |
| Failure load (lbs) | | | | | | | | | |
| Max. load (lbs) | | | | | | | | | |
| Sp Gr | | | | | | | | | |
| Flex Strength (psi) | | | | | | | | | |

That which is claimed is:

1. A flame retardant polymer blend comprising (a) polysulfone; (b) polyalkylenephthalate; (c) borate salt; and (d) polytetrafluoroethylene.

2. The flame retardant blend of claim 1 consisting essentially of polysulfone, polyalkylenephthalate, polytetrafluoroethylene and zinc borate.

3. The flame retardant blend of claim 1 consisting essentially of a weight ratio of polysulfone to polyalkylene phthalate of 95:5 to 50:50.

4. The flame retardant blend of claim 1 consisting essentially of a ratio of polysulfone to polyalkylenephthalate of about 60:40.

5. The flame retardant blend of claim 1 wherein said polytetrafluoroethylene is present in the amount of 0.5 to 10 weight percent.

6. The flame retardant blend of claim 1 wherein the borate salt is zinc borate present in an amount of 1 to 10 weight percent.

7. The blend of claim 1 wherein the polysulfone comprises the following repeat unit:

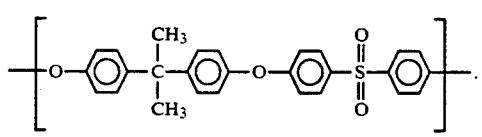

8. The blend of claim 1 wherein the polysulfone comprises the following repeat unit:

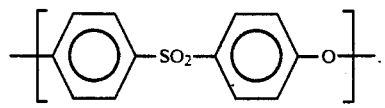

9. Blend of claim 1 wherein said polyalkylene phthalate comprises the following repeating unit:

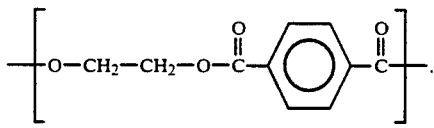

10. The blend of claim 1 wherein the polysulfone consists essentially of the following repeat unit:

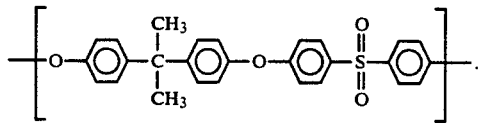

* * * * *